(12) United States Patent
Lan (10) Patent No.: US 6,276,759 B1
(45) Date of Patent: Aug. 21, 2001

(54) MOUNTING DEVICE FOR MOUNTING A FRONT WHEEL AXLE ON A STROLLER FRAME

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 09/553,472

(22) Filed: Apr. 20, 2000

(51) Int. Cl.[7] .................................................. B60B 29/00
(52) U.S. Cl. ........................... 301/111; 301/125; 301/119; 280/47.38; 280/62
(58) Field of Search .................................... 301/111, 119, 301/120, 121, 122, 125; 280/279, 62, 47.38, 650, 847, 852.1, 852

(56) References Cited

U.S. PATENT DOCUMENTS

| | | | |
|---|---|---|---|
| D. 362,419 | * 9/1995 | Chih | 280/650 X |
| 5,121,973 | * 6/1992 | Phillips | 301/111 X |
| 5,476,275 | * 12/1995 | Baechler et al. | 208/47.38 |
| 5,673,925 | * 10/1997 | Stewart | 301/111 X |
| 5,772,223 | * 6/1998 | Letourneau | 301/111 X |
| 6,056,306 | * 5/2000 | Rust et al. | 280/47.38 X |
| 6,196,571 | * 3/2001 | Chen et al. | 280/650 X |

FOREIGN PATENT DOCUMENTS

451599 * 9/1949 (IT) ..................................... 301/111

* cited by examiner

Primary Examiner—D. Glenn Dayoan
Assistant Examiner—Patricia Engle
(74) Attorney, Agent, or Firm—Foley & Lardner (57) ABSTRACT

A mounting device for mounting a front wheel axle on a stroller frame, includes a pair of hollow mounting seats, each of which has an inner side wall formed with an upwardly extending opening and an abutment edge that defines a top end of the opening. Each mounting seat has a resilient engaging plate which is disposed inwardly of the opening and which is inclined with respect to the inner side wall. The engaging plate has an engaging end proximate to the abutment edge and cooperating with the abutment edge to form a retaining space therebetween, and a connecting end distal to the abutment edge. The openings in the mounting seats permit the wheel axle to slide therealong toward the abutment edges so as to enable end portions of the wheel axle to push the engaging ends of the engaging plates away from each other, and to further enable the engaging ends to spring back toward each other for retaining the end portions of the wheel axle in the retaining spaces when the end portions of the wheel axle extend into the retaining spaces.

8 Claims, 7 Drawing Sheets

MOUNTING DEVICE FOR MOUNTING A FRONT WHEEL AXLE ON A STROLLER FRAME

BACKGROUND OF THE INVENTION

1. Field of the Invention

This invention relates to a mounting device for mounting a front wheel axle on a stroller frame, more particularly to a mounting device which facilitates assembly and disassembly of a front wheel axle on and from a stroller frame.

2. Description of the Related Art

Figure 1:
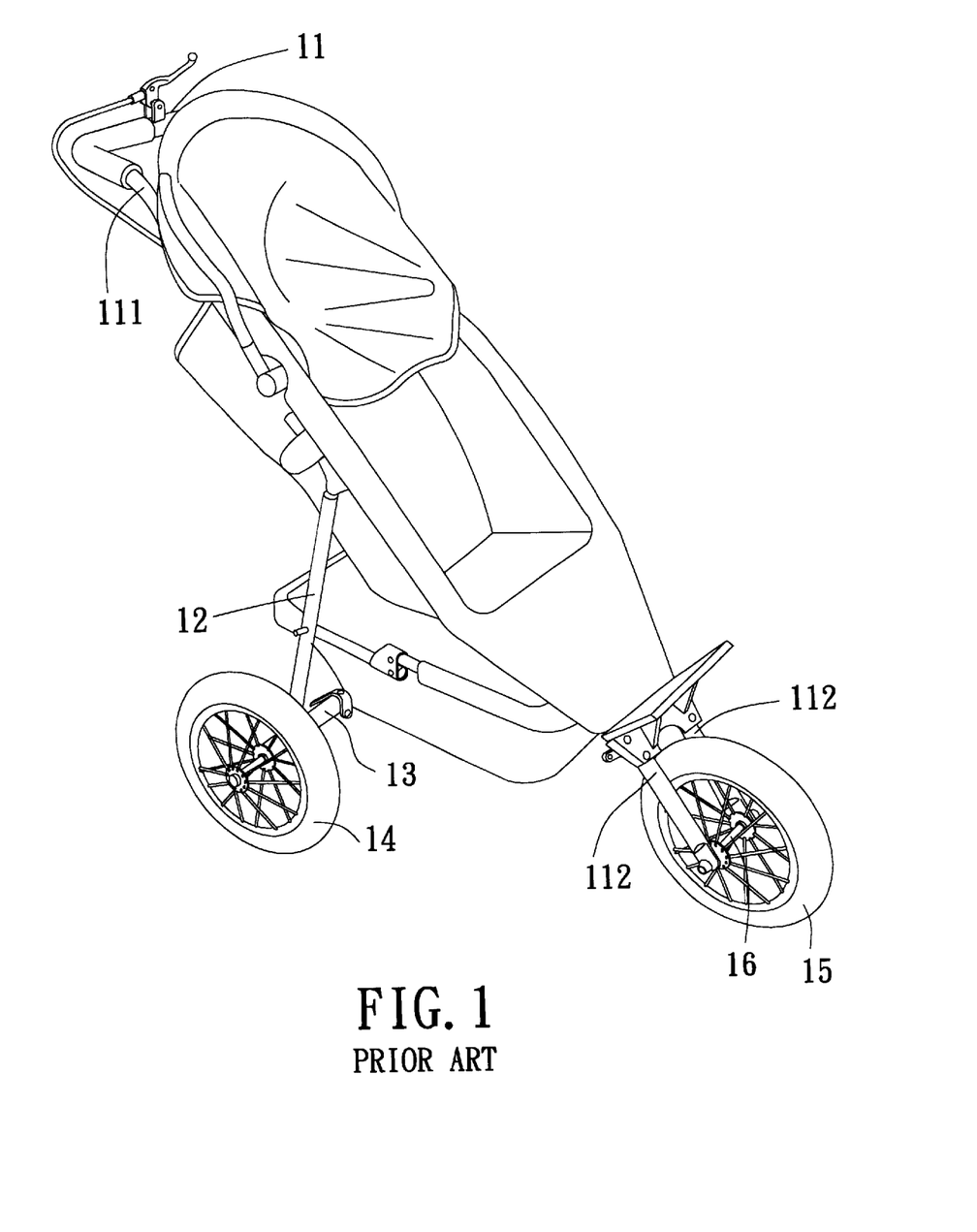
FIG. 1 is a perspective view of a conventional stroller.
Figure 2:
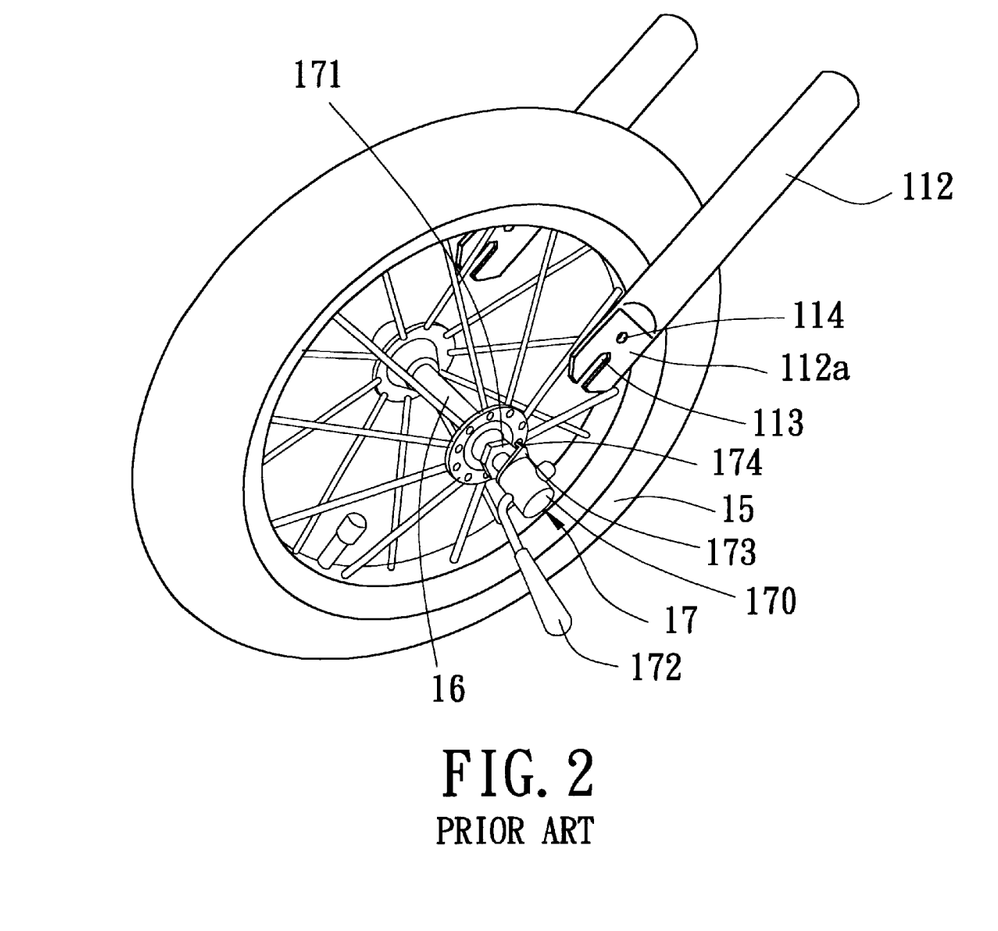
FIG. 2 is a partly exploded fragmentary perspective view illustrating how a front wheel is mounted on a front end portion of a stroller frame of the stroller of FIG. 1.

A three-wheeled stroller is known to include a front wheel and two spaced-apart rear wheels. FIG. 1 illustrates a conventional three-wheeled stroller frame which includes an inverted U-shaped handle 11 with parallel side arms 111, a parallel pair of rear support rods 12 disposed below and connected pivotally to the side arms 111, and a transverse shaft 13 connected to lower ends of the rear support rods 12 and carrying two rear wheels 14 at two opposite ends thereof. The stroller frame has a front end portion formed with a pair of spaced-apart side tubes 112 for cooperatively carrying a front wheel 15. As shown in FIG. 2, each of the side tubes 112 has a flat distal end portion 112a which is formed with a notch 113 and an engaging hole 114 above the notch 113. The front wheel 15 has a wheel axle 16 with two opposite end portions which are extended respectively into the notches 113, and which are secured to the side tubes 112 by means of a securing device 17. The securing device 17 includes an engaging plate 173 that abuts tightly against the distal end portion 112a of a respective one of the side tubes 112a so as to clamp the distal end portion 112a of the respective side tube 112 between the engaging plate 173 and an adjacent nut 171 on the respective end portion of the wheel axle 16. The engaging plate 173 has a bent tip 174 for engaging the engaging hole 114 in the distal end portion 112a of the respective side tube 112. The securing device 17 further includes a cylindrical cam member 170 and an operating lever 172 which are manually operable to push the engaging plate 173 toward the distal end portion 112a of the respective side tube 112 for abutting tightly against the latter during assembly of the wheel axle 16 to the side tubes 112. When it is desired to disassemble the front wheel axle 16 from the stroller frame, the cam member 170 and the operating lever 172 have to be operated for loosening the engaging plate 173 from the distal end portion 112a of the respective side tube 112. The assembly and disassembly operations are found to be somewhat inconvenient to conduct.

SUMMARY OF THE INVENTION

Therefore, the object of the present invention is to provide a mounting device for mounting a front wheel axle on a stroller frame so as to facilitate the assembly and disassembly of the front wheel axle on and from the stroller frame.

Accordingly, the mounting device of the present invention is adapted for mounting a front wheel axle on two spaced apart side tubes of a stroller frame. The side tubes have distal end portions. The front wheel axle has two opposite end portions. The mounting device includes a pair of hollow mounting seats, each of which is adapted to be disposed between a respective one of the end portions of the wheel axle and the distal end portion of a respective one of the side tubes. Each of the mounting seats has an inner side wall facing the other one of the mounting seats, an outer side wall opposite to the inner side wall, a bottom end wall interconnecting the inner and outer side walls, and a top end wall opposite to the bottom end wall. The inner side wall is formed with an elongated opening which extends in an upward direction along the inner side wall and which is adapted to permit extension of the respective one of the end portions of the wheel axle thereinto. The inner side wall has an abutment edge portion that defines a top end of the elongated opening. Each of the mounting seats further has a resilient engaging plate which is disposed inwardly of the opening between the inner and outer side walls and which is inclined with respect to the inner side wall. The engaging plate has an engaging end which is proximate to the abutment edge portion of the inner side wall and which cooperates with the abutment edge portion to form a retaining space therebetween, and a connecting end distal to the abutment edge portion. The retaining space is adapted to receive the respective one of the end portions of the front wheel axle therein. The distance between the connecting ends of the engaging plates of the mounting seats is longer than the distance between the engaging ends of the engaging plates of the mounting seats. The openings in the inner side walls of the mounting seats are adapted to permit the front wheel axle to slide therealong toward the abutment edge portions of the inner side walls of the mounting seats so as to enable the end portions of the front wheel axle to push the engaging ends of the engaging plates away from each other and to further enable the engaging ends of the engaging plates to spring back toward each other for retaining the end portions of the wheel axle in the retaining spaces when the end portions of the wheel axle extend into the retaining spaces.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
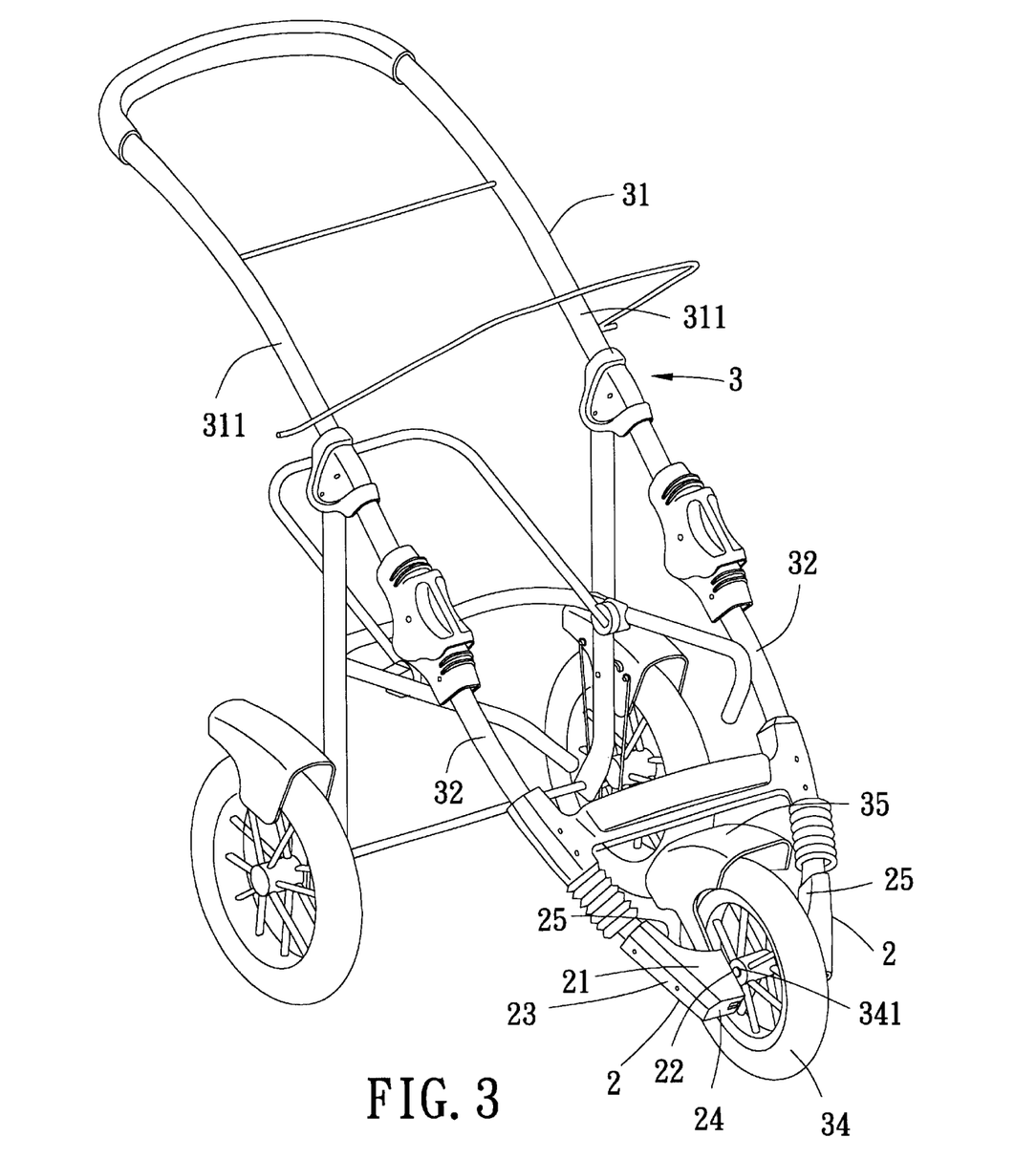
FIG. 3 is a perspective view of a stroller frame incorporating a preferred embodiment of the mounting device of the present invention.
Figure 4:
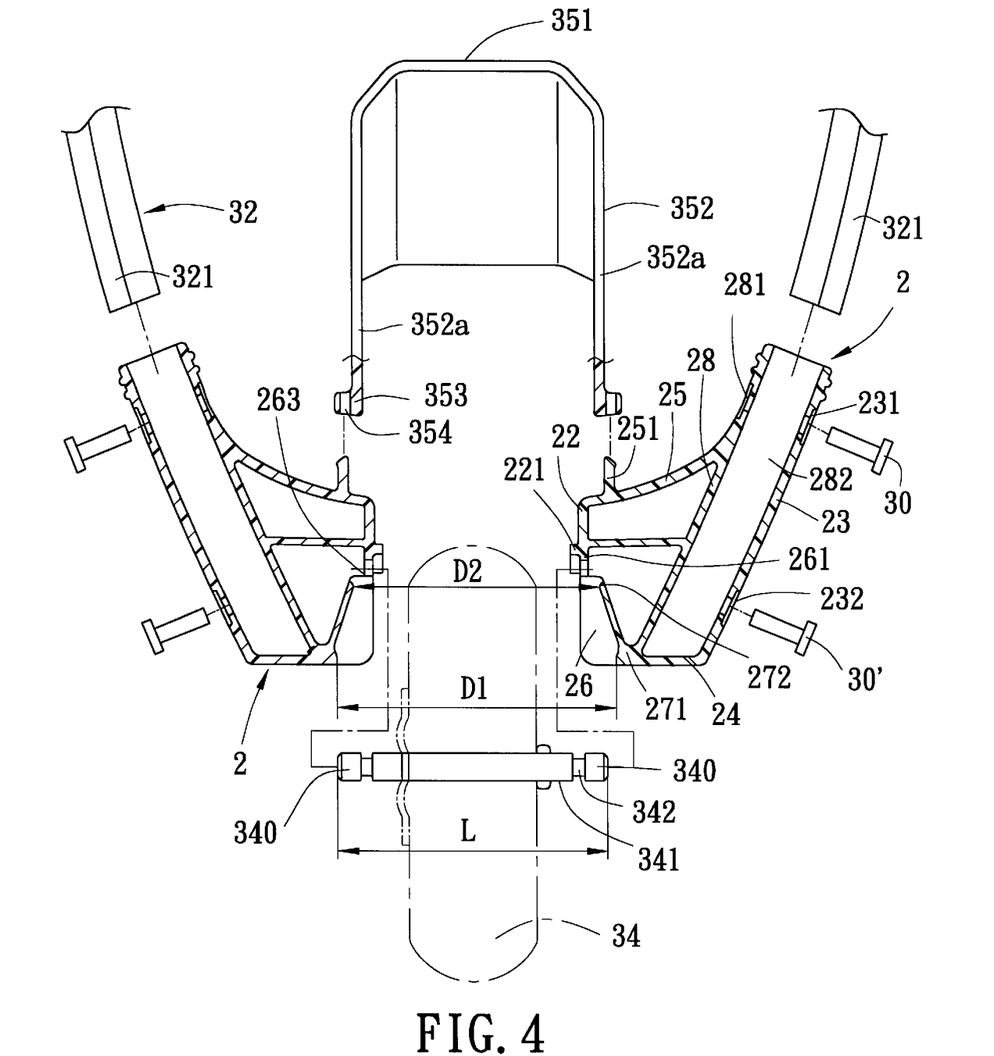
FIG. 4 is an exploded sectional view illustrating the preferred embodiment.

Referring to FIGS. 3 and 4, the preferred embodiment of the mounting device of the present invention is adapted to be used in a stroller frame 3 for mounting a front wheel 34 on the stroller frame 3. The stroller frame 3 includes an inverted U-shaped handle 31 with parallel side arms 311, and two spaced-apart side tubes 32 extending downwardly and forwardly from the side arms 311. The side tubes 32 converge forwardly for cooperatively carrying the front wheel 34 at distal end portions 321 thereof. The front wheel 34 has a wheel axle 341 with two opposite lateral end portions 340.

Each of the end portions 340 of the wheel axle 341 is formed with an annular groove 342. A curved mudguard 35 is disposed above the front wheel 34, and includes a top plate 351 and a pair of side plates 352 extending downwardly from the top plate 351 to the lateral sides of the front wheel 34. Each of the side plates 352 has a downward extension 352a that has a bent lower end 353 formed with a vertical engaging hole 354.

The mounting device includes a pair of hollow mounting seats 2 adapted to be disposed on the lateral sides of the front wheel 34. Each of the mounting seats 2 is adapted to be disposed between a respective one of the end portions 340 of the front wheel axle 341 and the distal end portion 321 of a respective one of the side tubes 32.

Figure 5:
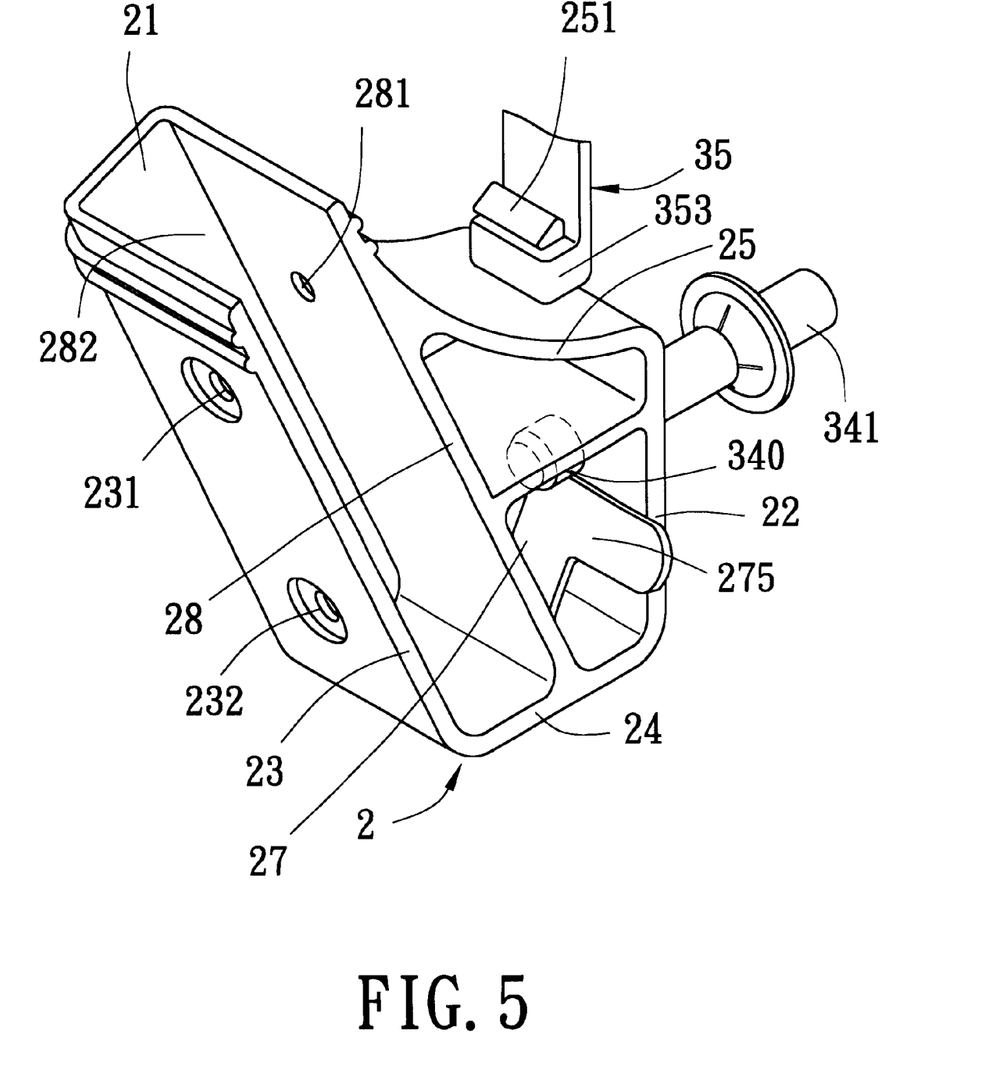
FIG. 5 is a rear perspective view illustrating a mounting seat of the mounting device of the preferred embodiment.

Referring to FIGS. 4 and 5, each of the mounting seats 2 is formed integrally from a plastic material, and has an inner side wall 22 which faces the other one of the mounting seats 2 and which is adapted to confront a respective one of the lateral sides of the front wheel 34, an outer side wall 23 opposite to the inner side wall 22, a bottom end wall 24 interconnecting the inner and outer side walls 22, 23, a curved top end wall 25 opposite to the bottom end wall 24, and a front side wall 21 extending among the inner and outer side walls 22, 23 and the top and bottom end walls 25, 24 for covering a front side of the mounting seat 2. The mounting seat 2 further has a partition wall 28 disposed between the inner and outer side walls 22, 23 and parallel to the outer side wall 23. The partition wall 28 cooperates with the outer side wall 23 to define a tube retaining space 282 therebetween. The tube retaining space 282 is adapted for receiving the distal end portion 321 of a respective one of the side tubes 321. The partition wall 28 and the outer side wall 23 are formed with aligned first fastener holes 281, 231 which are adapted to permit extension of a fastener 30 therethrough for fastening the distal end portion 321 of the respective one of the side tubes 32 to the mounting seat 2. The outer side wall 23 has a lower portion formed with a second fastener hole 232 that is adapted to permit extension of another fastener 30' therethrough for securing the distal end portion 321 of the respective one of the side tubes 32 on the outer side wall 23. The top end wall 25 is formed with an engaging projection 251 that has an upper barb end adapted to extend through and engage the engaging hole 354 in a respective one of the downward extensions 352 of the mudguard 35 for mounting the mudguard 35 on the mounting seats 2 such that the mudguard 35 bridges the mounting seats 2.

Figure 6:
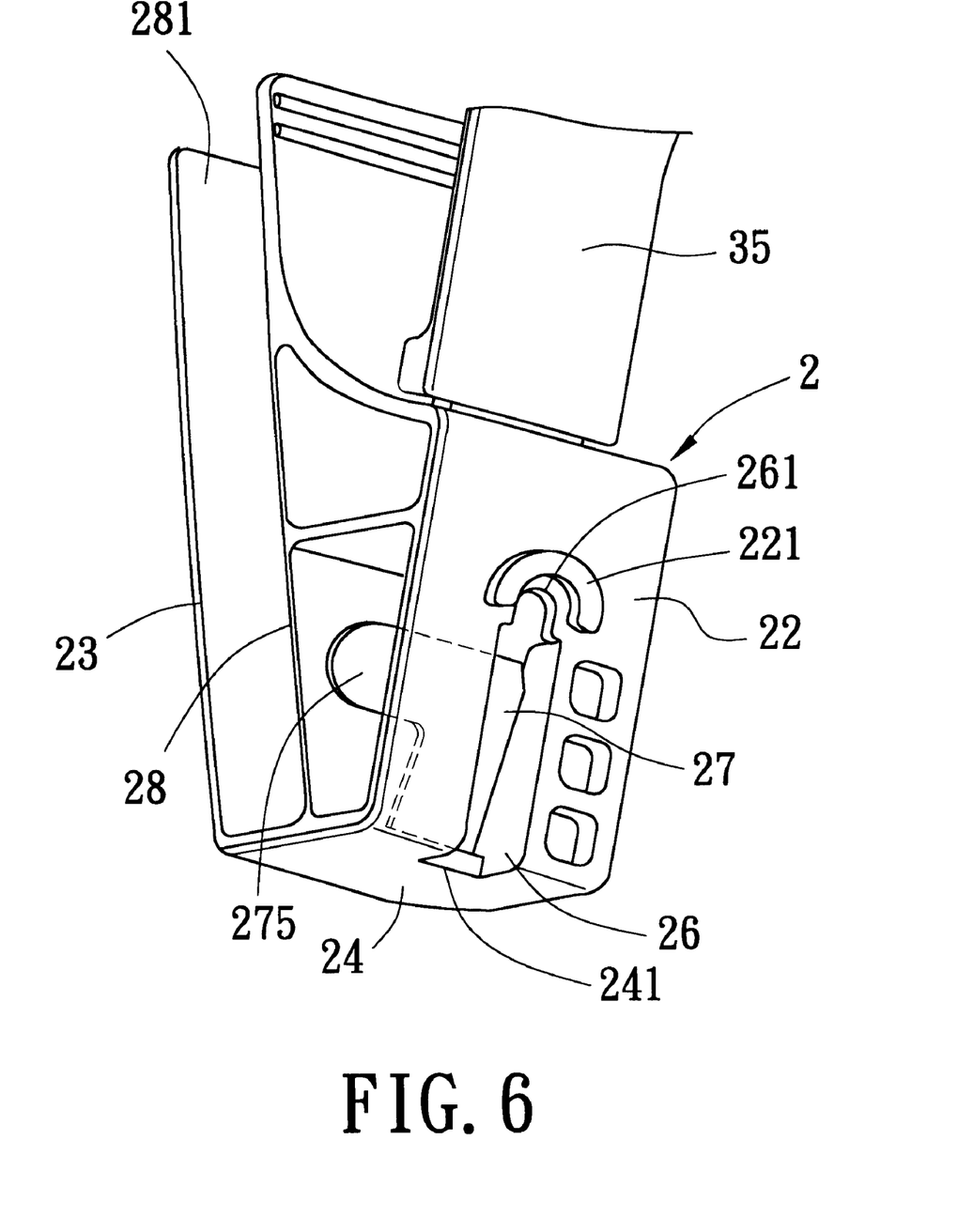
FIG. 6 is another perspective view illustrating the mounting seat of FIG. 5.

Referring to FIGS. 4 and 6, the inner side wall 22 of each of the mounting seats 2 is formed with an elongated opening 26 that extends upwardly from the bottom end wall 24. The bottom end wall 24 has an inner edge formed with a notch 241 that extends to the opening 26. The inner side wall 22 further has a curved abutment edge portion 261 that defines a top end of the opening 26, and a curved rim 221 adjacent to the top end of the opening 26 and projecting toward the other one of the mounting seats 2. Each of the mounting seats 2 is further formed with a resilient engaging plate 27 that is disposed between the inner side wall 22 and the partition wall 28 and inwardly of the opening 26. The engaging plate 27 extends upwardly from the bottom end wall 24 toward the abutment edge portion 26, and inclines toward the inner side wall 22. The engaging plate 27 has a distal engaging end 272 proximate to the abutment edge portion 261 of the inner side wall 22, and a connecting end 271 distal to the abutment edge portion 261 and connected integrally to the bottom end wall 24. The engaging end 272 cooperates with the abutment edge portion 261 of the inner side wall 22 to define a retaining space 263 therebetween.

The engaging plate 27 is formed with an engaging projection 275 that is accessible via an open rear side of the mounting seat 2 to permit operation of the engaging plate 27. As shown in FIG. 4, the mounting seats 2 are adapted to be disposed at suitable positions relative to each other such that the distance (D1) between the connecting ends 271 of the engaging plates 27 of the mounting seats 2 is longer than the axial length (L) of the wheel axle 341, and such that the distance (D2) between the engaging ends 272 of the engaging plates 27 of the mounting seats 2 is shorter than the axial length (L) of the wheel axle 341.

Figure 7:
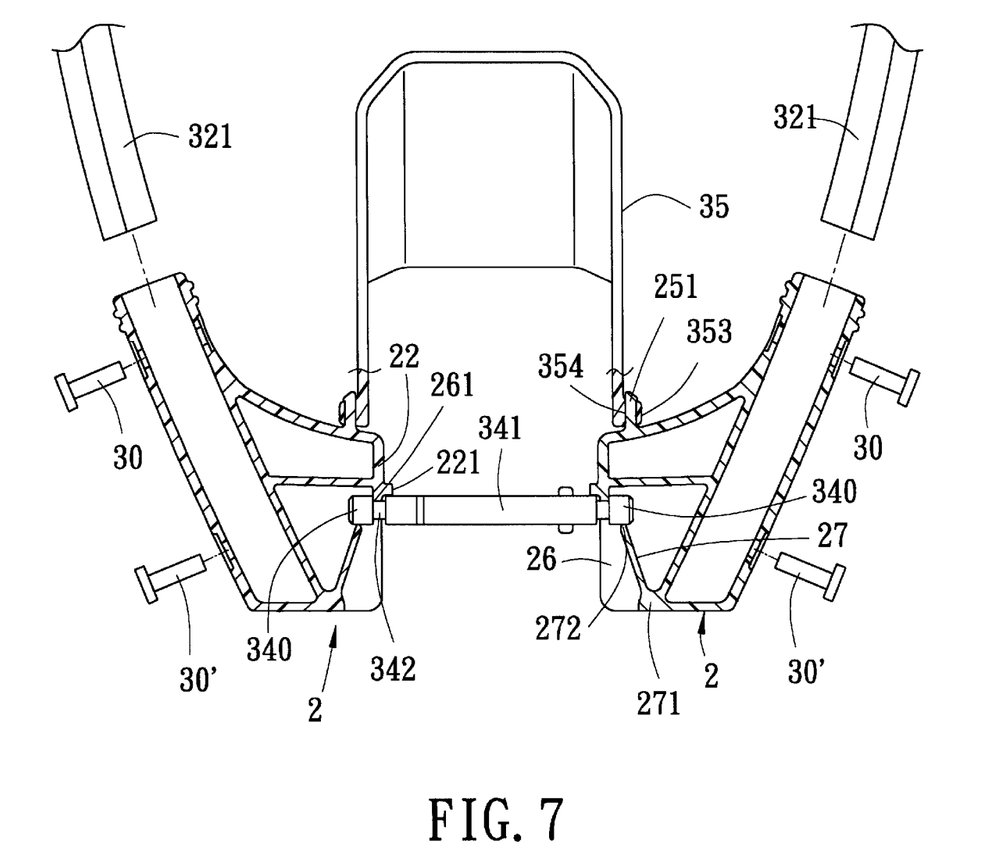
FIG. 7 is a sectional view of the mounting device of the preferred embodiment when mounted with a front wheel axle.

Referring to FIGS. 3 and 7, when the mounting device of the preferred embodiment is used for mounting the front wheel 34 to the stroller frame 3, the mounting seats 2 are fastened respectively to the distal end portions 321 of the side tubes 32 by means of the fasteners 30, 30'. The engaging projections 251 on the mounting seats 25 are then extended through the engaging holes 354 in the mudguard 35 for mounting the mudguard 35 on the mounting seats 2. Thereafter, the wheel axle 341 of the front wheel 34 is moved toward the mounting seats 2 in an upward direction from below the mounting seats 2 to allow the end portions 340 thereof to extend respectively into the openings 26 via the notches 241 in the bottom end walls 24 of the mounting seats 2. As the wheel axle 341 continues to slide upwardly along the openings 26 toward the abutment edge portions 261, the engaging ends 272 of the engaging plates 27 are pushed away from each other by the end portions 340 of the wheel axle 341. When the end portions 340 of the wheel axle 341 move past the engaging ends 272 of the engaging plates 27 and extend into the retaining spaces 263, the engaging ends 272 of the engaging plates 27 are allowed to spring back toward each other due to the resiliency thereof for retaining the end portions 340 of the wheel axle 341 in the retaining spaces 263. In this situation, the wheel axle 341 abuts against the curved rim 221 on the inner side walls 22 of the mounting seats 2. The abutment edge portion 261 of the inner side wall 22 of each of the mounting seats 2 extends into the annular groove 342 in the respective end portion 340 of the wheel axle 34. The abutment edge portion 261 thus serves as a stop projection to restrict lateral movement of the wheel axle 341 relative to the mounting seat 2. After assembly, the weight of the stroller frame 3 is applied partially on the front wheel axle 341, thereby increasing the stability of the engagement between the wheel axle 341 and the mounting seats 2.

When it is desired to detach the front wheel 34 from the mounting device, the operating projections 275 of the engaging plates 27 of the mounting seats 2 are operated from the open rear sides of the mounting seats 2 for moving the engaging ends 272 of the engaging plates 27 away from the inner side walls 22 in order to disengage the respective end portion 340 of the wheel axle 341 and to permit removal of the respective end portion 340 of the wheel axle 341 from the retaining space 263 of the mounting seat 2.

It has thus been shown that, with the provision of the mounting device of the present invention, both assembly and disassembly of the front wheel 34 on and from the stroller frame 3 can be conducted easily and quickly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A mounting device for mounting a front wheel axle on two spaced-apart side tubes of a stroller frame, the side tubes having distal end portions, the front wheel axle having two opposite end portions, said mounting device comprising:

a pair of hollow mounting seats, each of which is adapted to be disposed between a respective one of the end portions of the wheel axle and the distal end portion of a respective one of the side tubes, each of said mounting seats having an inner side wall facing the other one of said mounting seats, an outer side wall opposite to said inner side wall, a bottom end wall interconnecting said inner and outer side walls, and a top end wall opposite to said bottom end wall, said inner side wall being formed with an elongated opening which extends in an upward direction along said inner side wall and which is adapted to permit extension of the respective one of the end portions of the wheel axle thereinto, said inner side wall having an abutment edge portion that defines a top end of said elongated opening, each of said mounting seats further having a resilient engaging plate which is disposed inwardly of said opening between said inner and outer side walls and which is inclined with respect to said inner side wall, said engaging plate having an engaging end which is proximate to said abutment edge portion of said inner side wall and which cooperates with said abutment edge portion to form a retaining space therebetween, and a connecting end distal to said abutment edge portion, said retaining space being adapted to receive the respective one of the end portions of the front wheel axle therein, the distance between said connecting ends of said engaging plates of said mounting seats being longer than the distance between said engaging ends of said engaging plates of said mounting seats, said openings in said inner side walls of said mounting seats being adapted to permit the front wheel axle to slide therealong toward said abutment edge portions of said inner side walls of said mounting seats so as to enable the end portions of the front wheel axle to push said engaging ends of said engaging plates away from each other and to further enable said engaging ends of said engaging plates to spring back toward each other for retaining the end portions of the wheel axle in the retaining spaces when the end portions of the wheel axle extend into the retaining spaces.

2. The mounting device according to claim 1, wherein each of said mounting seats is formed integrally from a plastic material.

3. The mounting device according to claim 1, wherein said connecting end of said engaging plate of each of said mounting seats is connected integrally to said bottom end wall of said mounting seat, said bottom end wall having an inner edge formed with a notch that extends to said opening in said inner side wall and that is adapted to permit the respective one of the end portions of the wheel axle to extend into said opening.

4. The mounting device according to claim 1, wherein each of said mounting seats is formed with a stop projection which is adapted to engage the respective one of the end portions of the front wheel axle so as to restrict lateral movement of the wheel axle relative to said mounting seats when the respective one of the end portions is received in said retaining space of said mounting seat.

5. The mounting device according to claim 1, wherein said top end wall of each of said mounting seats is formed with an engaging projection, said engaging projections of said mounting seats being adapted to engage a mudguard so as to be adapted to mount the mudguard on said mounting device.

6. The mounting device according to claim 1, wherein each of said mounting seats further has an open rear side, said engaging plate of each of said mounting seats being formed with an operating projection that is accessible via said open rear side so as to permit operation thereof for moving said engaging end away from said inner side wall in order to be adapted to disengage the respective one of the end portions of the wheel axle and to permit removal of the respective one of the end portions of the wheel axle from said retaining space of said mounting seat.

7. The mounting device according to claim 1, wherein each of said mounting seats further has a partition wall disposed between said inner and outer side walls and parallel to said outer side wall, said partition wall and said outer side wall cooperatively defining a tube retaining hole that is adapted for receiving the distal end portion of a respective one of the side tubes of the stroller frame.

8. The mounting device according to claim 7, wherein said partition wall and said outer side wall are formed with aligned fastener holes adapted to permit extension of a fastener therethrough for fastening the distal end portion of the respective one of the side tubes on said mounting seat.

* * * * *